United States Patent [19]

Palmer

[11] 4,335,381
[45] Jun. 15, 1982

[54] REMOTE CONTROL OF ELECTRICAL DEVICES

[75] Inventor: Robin Palmer, Harlow, England

[73] Assignee: Rovex Limited, England

[21] Appl. No.: 66,550

[22] Filed: Aug. 14, 1979

[30] Foreign Application Priority Data

Aug. 15, 1978 [GB] United Kingdom ............... 33372/78
May 22, 1979 [GB] United Kingdom ................ 7917702

[51] Int. Cl.$^3$ ............................................. H04Q 9/00
[52] U.S. Cl. ............................. 340/825.21; 104/301; 246/187 A; 340/310 R
[58] Field of Search ............... 340/163, 310 A, 147 R, 340/163, 310 R; 307/2, 3, 9, 261, 268; 328/28; 246/34 B, 187 A, 34 R; 104/147 A, 151

[56] References Cited

U.S. PATENT DOCUMENTS

| | | | |
|---|---|---|---|
| 2,257,473 | 9/1941 | McKeige et al. | 246/187 A |
| 3,211,111 | 10/1965 | Morley | 104/151 |
| 3,701,101 | 10/1972 | Heiz et al. | 340/163 |
| 3,810,099 | 5/1974 | Woods | 340/171 R |
| 3,964,701 | 6/1976 | Kacerek | 104/147 A |
| 4,065,081 | 12/1977 | Huffman et al. | 246/34 R |
| 4,085,402 | 4/1978 | Krygeris et al. | 340/147 R |
| 4,085,403 | 4/1978 | Meier et al. | 340/163 |
| 4,097,692 | 6/1978 | Felix | 340/310 R |
| 4,136,327 | 1/1979 | Flanders et al. | 340/310 A |
| 4,163,218 | 7/1979 | Wu | 340/310 A |
| 4,179,624 | 12/1979 | Shindo et al. | 340/310 A |

FOREIGN PATENT DOCUMENTS

1500891 2/1978 United Kingdom .

Primary Examiner—Donald J. Yusko
Attorney, Agent, or Firm—Lewis H. Eslinger

[57] ABSTRACT

A remote control system for use e.g. in controlling the locomotives and ancillary devices of a model train layout comprises a transmitter and a number of receivers incorporated in the devices to be controlled. A composite waveform is applied across the tracks, comprising a rectangular power supply waveform with intervals between positive and negative path cycles and control signals which occur in the latter parts of these intervals, the delay between the end of each half cycle and the control signals allowing time for reactive currents resulting from inductive loads to decay. The composite waveform is synthesized by two switching amplifiers driven by a microprocessor and having associated with it slider controls and a keyboard for controlling the receivers. The receivers are programmed to identify control signals addressed to them and to control an associated locomotive or an ancillary device appropriately. The address to which each receiver responds can be programmed by selective breaking of a number of tabs on a circuit board on which the receiver IC is mounted.

36 Claims, 12 Drawing Figures

DATA CYCLE FOR 16 TRAINS. (160 ms)

Fig.2b
POWER AVAILABLE ACROSS LOAD +

Fig.2c
POWER AVAILABLE ACROSS LOAD −

Fig. 3

POWER CYCLE SHOWING THREE DATA BURSTS

REMOTE CONTROL OF ELECTRICAL DEVICES

DESCRIPTION

The present invention relates to the remote control of one or more electrical devices.

More particular the present invention is concerned with a system in which one or more electrical devices are each controlled by an associated receiver in response to control signals transmitted from a remote transmitter via a power supply line by means of which the electrical device(s) is energised.

In such systems serious problems can arise where the electrical device is of a nature such that its operation causes electrical noise to be injected back into the power supply line as is the case with, for example, devices such as electric motors, as this noise can interfere with the operation of the receiver (and thus the device itself).

According to the present invention there is provided a remote control system for controlling one or more electrical devices via power supply lines used to energise the device or devices, in use where being applied across the supply lines a composite waveform comprising control signals and a cyclically repeating power supply waveform, each cycle of the power supply waveform comprising one or more intervals during which it is substantially zero in amplitude, the system comprising a transmitter for producing the control signals in timed relationship with the power supply waveform so that the occurrences of the control signals are confined to the latter parts of said intervals of the power supply waveform and at least one receiver adapted to receive a composite waveform and to identify received control signals assigned thereto and to appropriately control an associated electrical device.

The invention also provides a transmitter for a remote control system in use of which one or more electrical devices are controlled using control signals transmitted via the power supply lines used to energise the device or devices, the waveform across the power supply lines comprising control signals and a cyclically repeating power supply waveform the power supply waveform comprising at least one interval during each cycle during which its amplitude is substantially zero, the transmitter comprising circuitry arranged to produce the control signals in timed relation with the power supply waveforms so that the occurrences of the control signals are confined to the latter parts of said intervals.

The invention further provides a receiver for a remote control system in which control signals are transmitted to at least one such receiver via power supply lines used to energise the electrical device or devices associated with the receiver or receivers, the power supply lines, in use, carrying a composite waveform comprising a cyclically repeating power supply waveform having one or more intervals during each cycle when its amplitude is substantially zero and control signals, the control signals being confined to the latter parts of said intervals, the receiver being adapted to identify control signals assigned thereto and to appropriately control an associated electrical device in response thereto.

The power supply waveform is preferably rectangular.

The delay which thus occurs between the end of the non-zero part of a half cycle of the supply waveform and the control signals allows time for decay of reactive currents resulting from the electrical devices presenting inductive loads to the power supply lines.

Where there are a number of receivers, control signals to the receivers can be transmitted in rotation during respective time slots. To enable each receiver to recognise control signals assigned to it, each control signal may comprise address data designating the intended recipient receiver as well as the control data itself. The control signals may be in the form of a stream of bits combined with the supply waveform according to a desired modulation scheme, the address data and/or the control data may have one or more parity bits or error detect and correct bits added into the bit stream to enable the receivers to detect correct reception of the control signals.

The invention will be further described with reference to the accompanying drawings in which.

In the following an embodiment of the present invention is described in the context of its application to a model train layout. It will be appreciated that the invention may also be used in other applications using a similar method of remote control, many, if not all of the features of the system may be used, with modifications where appropriate in such other applications of this invention.

Figure 1:
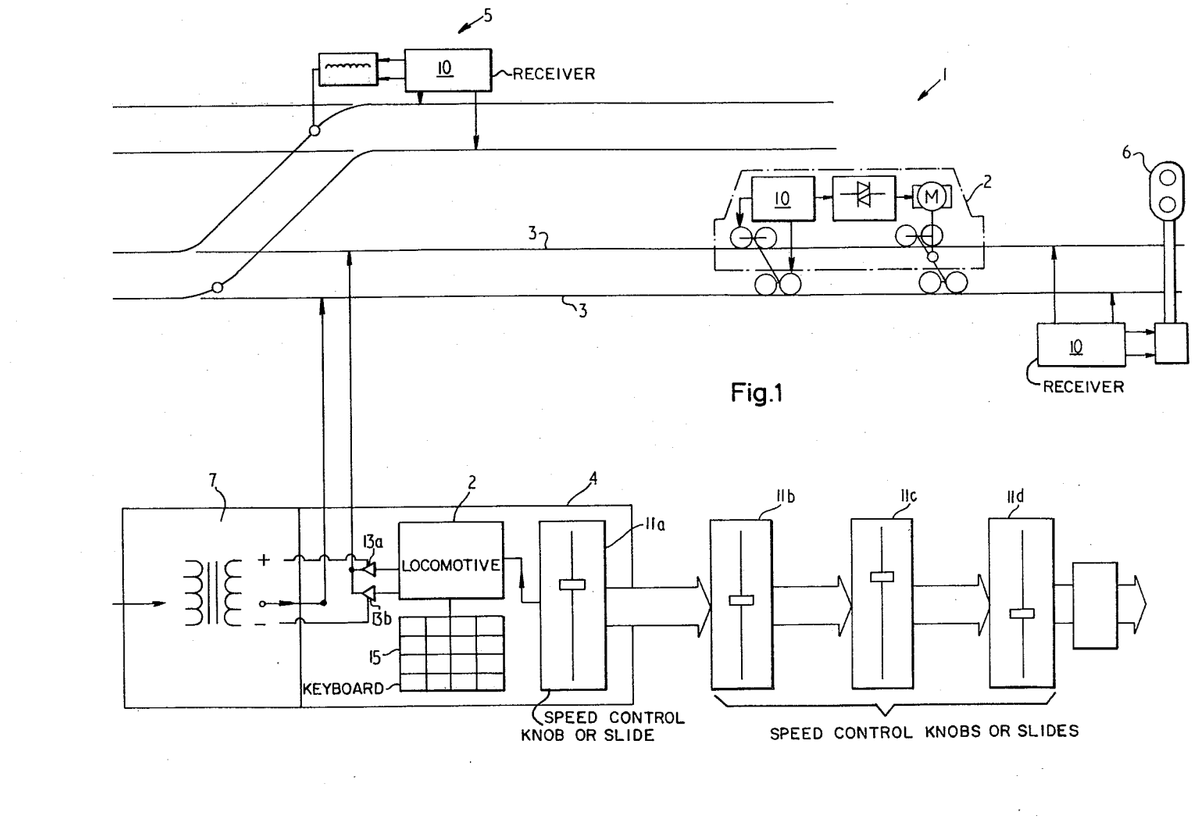
FIG. 1 is a somewhat schematic diagram of a model train layout incorporating an embodiment of system according to the present invention.

FIG. 1 shows a model train layout 1 which comprises a number of electrically driven locomotives such as 2 running on a common track 3 and controlled by means of a controller 4. Each locomotive 2 takes its power by means of a current collector from the track 3. A control device, carried in the locomotive and connected between the current collector and electric motor, is capable of varying the speed and direction in a proportional manner. The speed requirement for each locomotive on the system is uniquely transmitted from the controller 4, through the track in common with the power supply. A receiver in each locomotive is able to translate this signal into the required control function. Thus, from a central control box connected to the track system it is possible to control each locomotive individually on it.

The system also includes ancillary devices such as electrically operated points 5 and signals 6 each of which incorporates a receiver connected to the common track at various remote parts in order to drive actuators for operating points, signals and other ancillary equipment. Each one of these may be commanded to operate as required by means of a unique coded signal transmitted from the central controller 4 via the trackwork.

The power for all the locomotives in use, and ancillaries, is fed via the system trackwork. Thus, the majority of the track may be regarded as a two connector bus (except where loops occur and hence switched isolated sections are essential).

The choice of either a DC or AC supply may be crucial in terms of overall practical economics, but does not affect the overall operating concept or the fundamentals of the signal transmission method employed. In the illustrated embodiment, the power supply waveform is a 20V pk rectangular waveform derived by transformer 7 from the mains supply.

The output of the centre tapped transformer 7 is full wave rectified by four diodes 52a–d and smoothed by capacitors 52 and 53 to provide positive and negative supplies for two switching amplifiers 13a, 13b which are used to synthesise the composite waveform to be applied across the tracks. Connected across the capacitor 53 is a voltage regulator 8 used to derive a regulated supply for the remainder of the transmitter circuitry.

The principal requirements for the simultaneous transmission of power and control signals on the track with economical generation, reception and decoding is best met by means of binary coded pulses which are combined with the power supply waveform. By this means dependence on "analogue" components can largely be avoided as there is no "carrier" as such. By using a sufficient number of bits in a transmitted coded word as many control functions and greater resolution of speed control on any number of locomotives as required may be accomplished. The limitations are set by the constraints of maximum data rate versus noise immunity and available transmission time.

The choice of a suitable pulse modulation technique is largely governed by the needs of receiver economy. Independence from accurate locally generated (receiver) clocks or timing signals should be achieved in order to avoid the need to use quartz crystals or other frequency or time constant ultra-stable components or relatively high cost and/or bulk.

The control signals should have zero DC component as otherwise there would be a continuously varying offset voltage. Thus, the encoding method should either be synchronously phase or frequency modulated in order to maintain zero average, that is, it can be sliced and regarded as a pulse width modulated signal of unipolarity independent of the actual polarity of the receiver connected to the current collectors or the direction of the locomotive placement on the track.

The small permanent magnet DC motors incorporated in model locomotives create a severe noise hazard for the data transmission system mainly due to the action of their commutators. The noise immunity of the transmitted signal can be optimised by several known methods.

Figure 3:
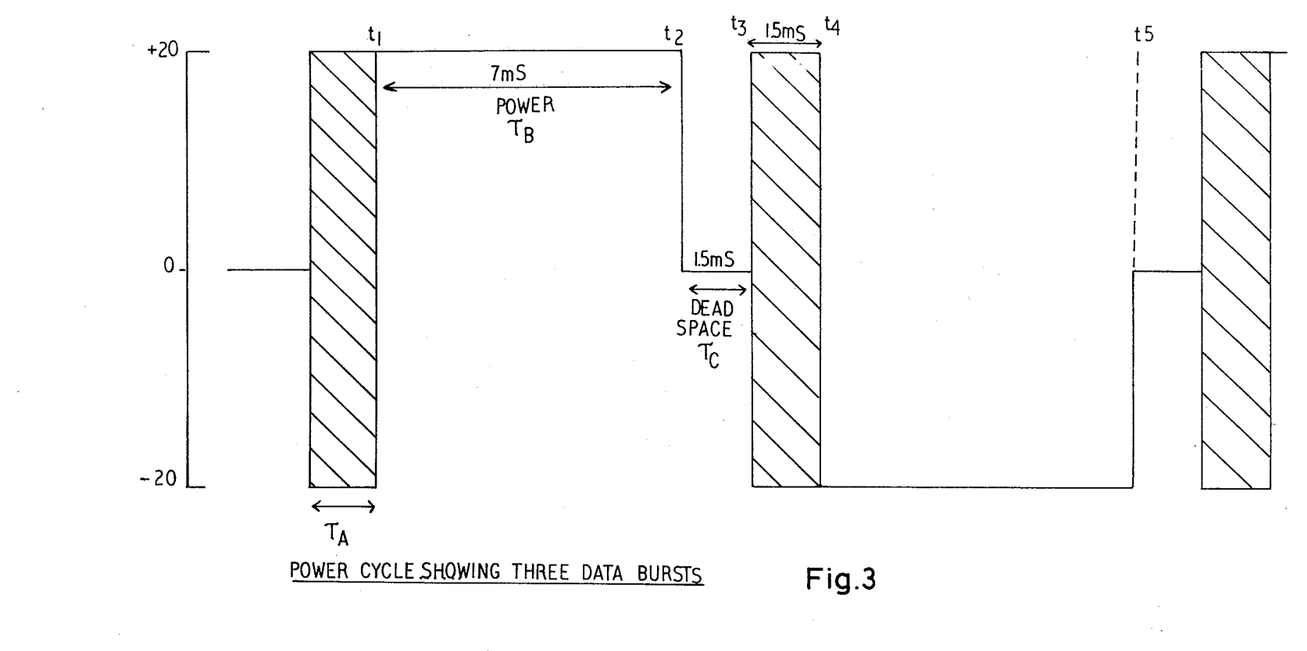
FIG. 3 shows a cycle of the composite waveform with the time and amplitude axes exaggerated.

FIG. 3 shows a complete cycle of the waveform applied across the rails of the track by amplifiers 13a and 13b. In the interval T1 and T2 the voltage applied across the rails is held steady at +20 V. This is one of the two intervals during the cycle when power is available to the motors of the locomotives and the various other devices of the system. At the time T2, the waveform is reduced to zero and held at this value for a period of 1.5 milliseconds. There then follows the 1.5 millisecond time interval T3–T4 which is the time slot assigned to one of the 16 locomotives during this time interval a binary word is transmitted, this word including an address indicating the locomotive or other device which the control information is intended, the control information itself and a number of leading and trailing and parity bits. Binary "ones" are each represented by one complete cycle of a square wave of 4.73 KHz frequency swinging between −20 and +20 V while binary zeros are each represented by one complete cycle of a 9.47 KHz frequency square wave of similar amplitude. At the end of the interval T3–T4, the waveform goes negative and remains at −20 V during the 7.0 millisecond interval T4–T5, this of course being the other period of the waveform during which power is supplied to the locomotives and other devices. At the time T5 the waveform returns to zero and is held at this value for 1.5 milliseconds whereupon at time T6 the next data cycle commences.

It will thus be appreciated that the waveform applied across the rails is essentially a rectangular power supply waveform oscillating between +20 and −20 V with 3.0 millisecond OV intervals between the positive and negative half cycles with the control signals being confined to latter parts of these OV intervals. As can be seen from FIG. 2A each of 16 locomotives is assigned a respective time slot in a data cycle which comprises eight cycles of the "power supply" waveform. FIGS. 2B and 2C show two waveforms which may be derived from the waveform across the rails to energise motors etc.

In an earlier version of our system described in British Patent Application 33372/78, a sinewave power supply waveform was used with the control signals injected just after the zero-crossings. However, with an inductive load e.g. a motor coil changes in current lag changes in voltage by a phase angle $\phi$ and as a result the load current goes to zero sometime after the supply voltage has reached a finite value in the opposite direction. Since the triac controlling the motor tries to turn-off at zero current there is the possibility that the motor is still "on" whilst data is being transmitted, thus causing difficulties especially as $\phi$ is a variable quantity dictated by the inductance and resistance of the load (e.g. the motor). The present composite waveform avoids these difficulties by using a defined "dead-space" to allow for delayed motor turn-off, before data transmission. Data is injected by switching on and off the same drive amplifiers 13a, 13b as are used to produce the power supply waveform. This method of data injection eliminated the need for the series choke in our previous system. A further benefit of the present system is a reduction in motor heating because of the improved form-factor of the power waveform, motor torque being proportional to average current and motor heat losses to the RMS content and the higher the form-factor, Irms/Iav, the higher the losses. Also the use of a rectangular power supply waveform makes for easier and more reliable extraction of the control signals as the tops and bottoms of the control signals do not change in amplitude as they would if superimposed on a sinuosoidal waveform.

Thus, in the system of FIG. 1 the data is transmitted when there is little or no power flowing and all the noise producing devices, such as the locomotive motors, are off and the noise problem is minimised.

The duration of the data time slots affects the maximum available power in a half cycle as the receivers incorporated in the locomotives and ancillaries are programmed so that phase angle control devices (triacs) used to control the loads (e.g. motors) may not be turned on until the last bit of data has been transmitted.

A memory located in each receiver stores the last received update until a new update of control data is successfully received and validated over numerous cycles and any small delay in a change of controller demand/actual speed is normally imperceptible.

Figure 2A:
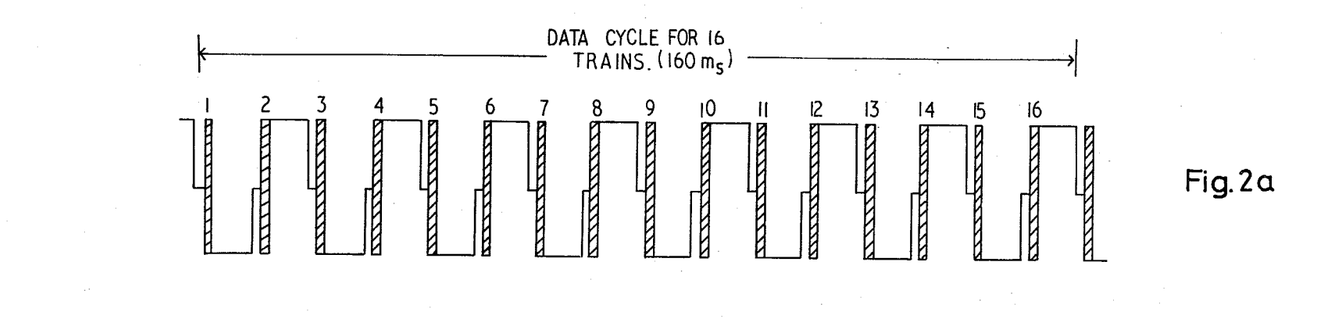
FIG. 2A shows the composite waveform applied across the tracks in the embodiment of FIG. 1.
Figures 2B, 2C:
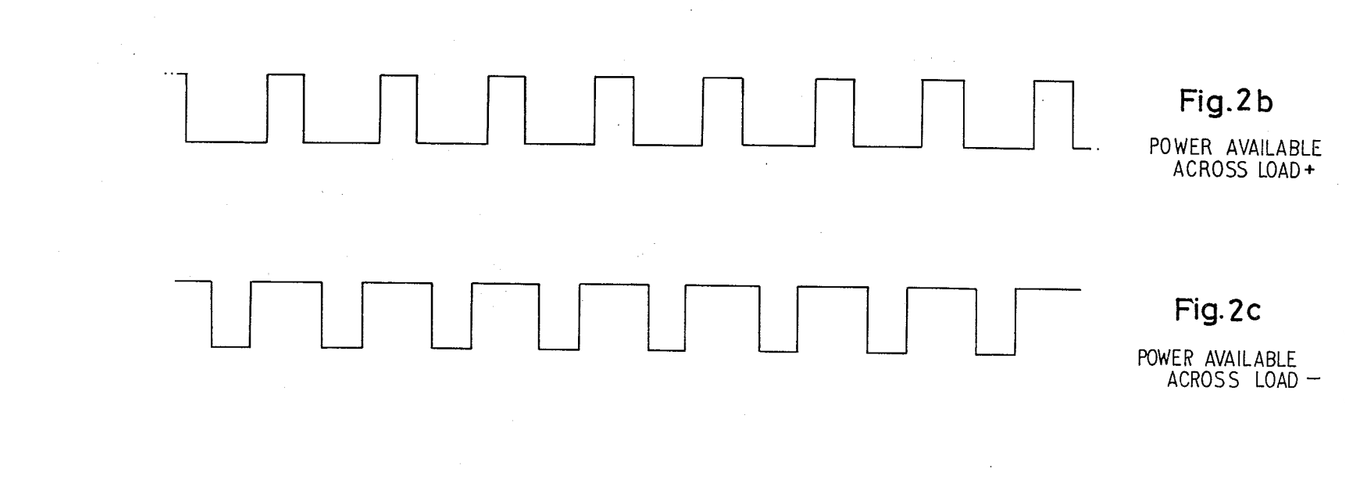
FIGS. 2B and 2C show positive and negative waveforms, respectively, which can be derived from the composite waveform for application across a load.

As indicated in FIG. 2A a number of locomotive receivers are each cyclically addressed (by means of a unique assigned number transmitted as part of the binary word) and updated with the controller speed/direction demand. This is done on the basis of one new address (locomotive) per zero-crossing i.e., two per cycle, each one being updated on a rotation basis. Hence, for a system with 16 locomotives to be addressed, each would be updated every 144 milliseconds. Additionally power for the memory in the receiver is provided via a storage device (e.g. a capacitor) in order to maintain the received data intact through momentary power interruptions, e.g., when the locomotive transverses points and the current collectors lose contact. Even if there is no update of the speed direction demand, the (previous) control data is still transmitted during each locomotives assigned time slot so as to ensure correct operation when, for example the locomotive is removed from the track and later replaced on it.

Figure 4:
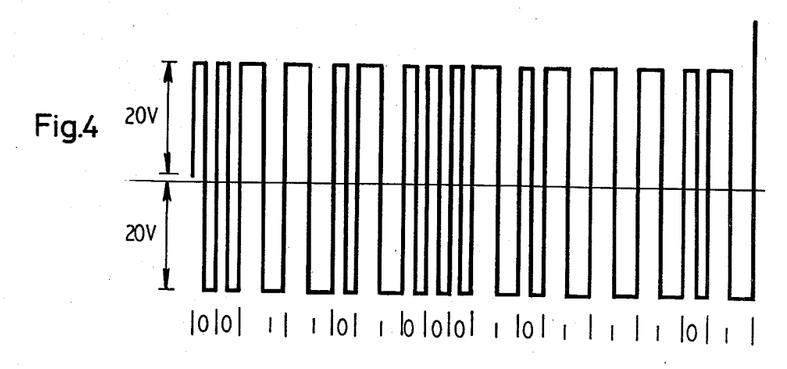
FIGS. 4 and 5 show the control signals.
Figure 5:
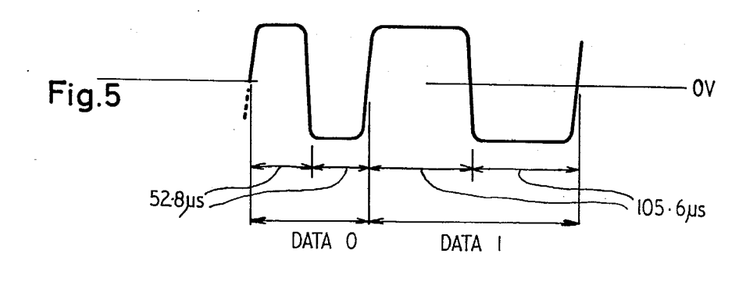

FIGS. 4 and 5 show typical waveforms of the data burst. As can be seen from FIG. 5 a "0" is represented by 1 complete cycle of 9.47 khz squarewave while a data "1" is represented by 1 complete cycle of 4.73 khz squarewave.

The reason for using at least one complete cycle of a waveform of which both positive and negative halves are similarly modulated is that it does not then matter what the polarity of the connections between the locomotive receiver and the track is, so that a locomotive can be removed from the track, turned round and replaced and its receiver will still receive the data correctly.

The principal control function of the controller 4 is the independent control of speed and direction of a number of the locomotives 2. The number chosen as the maximum controllable by the system relates to the maximum allowable update period in the multiplexing scheme and the number of bits in a control word used to address each one.

Since the speed of each locomotive 2 is transmitted as a sub-group of a binary control word, the receiver 10 has to make a digital to analogue conversion to translate binary speed to firing angle for the control device (triac). The number of bits used determines the speed resolution obtainable with each step.

The ancillary receiver function is designed to be able to operate devices which are essentially two state (e.g. on/off or left/right). The state of each output is easily maintained mechanically (in the case of a point) or by means of a latched output from the receiver 10. Since the receiver 10 is likely to be in a continuous contact with the track (unlike a locomotive) cycle updating is unnecessary. The command code to an ancillary receiver 10 need only be transmitted once for the required change of state. This can be achieved by 'stealing' an update cycle from the normal rotation of locomotive addresses. One or more bits must uniquely identify this function. The remaining bits in the word, even those in positions normally used for the loco address and speed can be used as an address function for the commanding of ancillary control receivers. For realistic motion, the locomotives should not respond instantaneously to a change in speed demand at the controller. Inertia may be added as a control function either at the controller 4 or at the loco receiver 10. This is achieved by incrementing or decrementing the demanded speed in a number of small steps, the speed demand thus simulating the effects of inertia.

Figure 6:
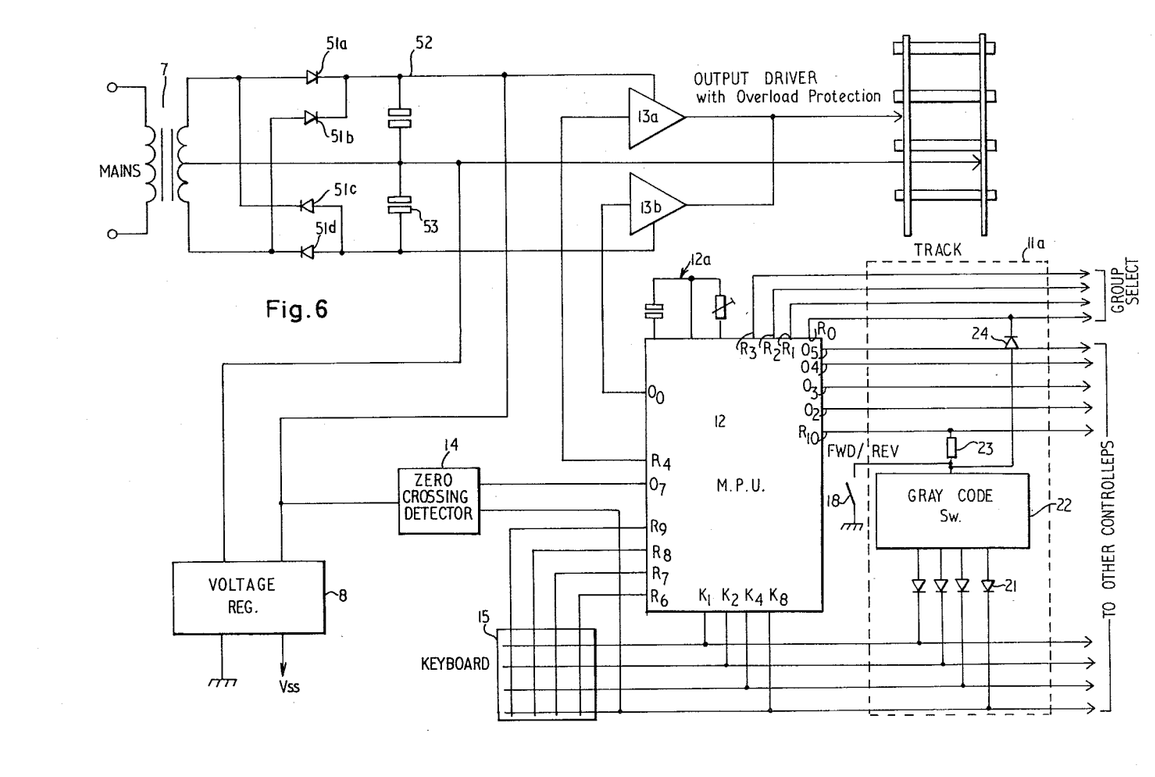
FIG. 6 is a somewhat schematic circuit diagram of the controller of the system of FIG. 1.

The controller 3, as indicated in FIGS. 1 and 6 comprises principally the following components:
 (a) transformer 7 and the associated multiplying and smoothing components;
 (b) DC low voltage supply 8 for the electronic circuitry in controller;
 (c) one or more speed control knobs or slides 11a,b,c ...;
 (d) a microprocessor 12 for data encoding and transmission with associated clock generation RC network 12a;
 (e) gated power amplifiers 13a, 13b for injecting "data" from the microprocessor 12 into the supply to the track 3, these amplifiers can incorporate conventional overload protection circuitry;
 (f) a zero-crossing detector 14 for detecting the zero-crossings of the AC supply waveform; and
 (g) a keyboard 15 for addressing locomotive and ancillary receivers.

The transformer 7 used with the controller should have sufficient output current capability at the system supply voltage to supply a load of at least two or more locomotives in operation plus the supply for the control electronics (approximately 5 W estimated).

Provided the phasing is correct, additional supply feeds can be attached to the track at remote points in parallel with the one at the controller 4.

In order to minimize the component count and increase controller reliability, the speed control knobs or sliders 11a,b,c... adopted are preferably each a Binary Coded Switch. Thus by suitable multiplexing position (angular or linear) will be directly translated into the speed code word. The switch operates in discrete steps, although these need not be apparent to the user. A Gray, or similar code, is used for the encoding (i.e. only one bit change per step), to avoid erroneous operation at the transition points. One possible scheme is as follows:

| | | MPU INPUTS | | | FUNCTION |
|---|---|---|---|---|---|
| | | K8 | K4 | K2 | K1 | |
| KNOB POSITION | 1 | 0 | 0 | 0 | 1 | zero speed (off) |
| | 2 | 0 | 0 | 1 | 1 | min speed |
| | 3 | 0 | 0 | 1 | 0 | |
| | 4 | 0 | 1 | 1 | 0 | |
| | 5 | 0 | 1 | 1 | 1 | |
| | 6 | 0 | 1 | 0 | 1 | |
| | 7 | 0 | 1 | 0 | 0 | |
| | 8 | 1 | 1 | 0 | 0 | |
| | 9 | 1 | 1 | 0 | 1 | Half speed |
| | 10 | 1 | 1 | 1 | 1 | |
| | 11 | 1 | 1 | 1 | 0 | |
| | 12 | 1 | 0 | 1 | 0 | |
| | 13 | 1 | 0 | 1 | 1 | |
| | 14 | 1 | 0 | 0 | 1 | |
| | 15 | 1 | 0 | 0 | 0 | Max speed (full on) |
| PUSH BUTTON ENCODED | | 0 | 0 | 0 | 0 | Direction Change |

The forward reverse function can be implemented by a pushbutton 18 associated with each control 11.

As the speed is ready encoded at the control 11 the outputs fron any number of similar controls 11 (one per locomotive under direct control) can be multiplexed together to minimize the total number of conductors needed to connect the controls. This feature allows additional controls to be added at a low cost as the system is expanded beyond a basic single control. These are each given a number e.g. 1 to 16 for a sixteen control knob unit which can be used on an assignment basis to any locomotive. Hence, it would be possible for control 1 to affect locomotive No. 1, control 2 to affect locomotive No. 4, control 3 to affect locomotive No. 2 and so on.

The MPU 12 can be programmed so that a particular locomotive address will be associated with one of the controllers 11a, b, etc. or alternatively so that a locomotive address can be assigned to each control 11 by use of the keyboard 15.

This facility would make it possible to control any loco on the system with any one "knob" simply with a numerical assignment.

The quantity of ancillary receivers used in a system may vary. They might be very numerous or very few, even zero. Instead of using a switch per function, which could be prohibitively expensive as well as complex, as indicated above a calculator type keyboard 15 is used. Thus, each device may be operated simply by tapping in its address as a one or multiple digit number and then causing the transmitter to signal the appropriate code on a 'stolen' cycle.

Additional keys may be added to the keyboard 15 so that further controller functions can be carried out without the need for any other switches or controls.

One possible set of functions is as follows:

|     | Key | Function |
| --- | --- | --- |
| (a) | 0 to 9 | Numerical Address Entry |
| (b) | ENTRY L* | Enters an ancillary (L) address for immediate transmission. Tapping this key again will cause the previous function to be repeated if no other key has been touched. |
| (c) | ENTRY R* | Same as (b) for ancillary (R) |
| (d) | CONTROL | Used for speed controller designation after keying in the number if a required control attached to the 'box'. |
| (e) | TRAIN | Used to assign a particular loco, having keyed in its (address) number to a particular control using CONTROL key. |
| (f) | INERTIA | Give specified loco with TRAIN key and number inertia once ENTRY R pressed. ENTRY 1 key removes effect. |
| (g) | CLEAR ENTRY | Clears previous last key action. Pressing twice clears last sequence of key actions. Used for mis-keyed error correction. |

*L and R here designate Left and Right (points) although for some ancillaries this could be L = Off and R = On.

The MPU 12 is programmed to perform all tasks required to implement the following functions:
 (a) Multiplex speed control inputs;
 (b) Store speed control inputs;
 (c) Multiplex connections to keyboard 15;
 (d) Input and store keyboard 15 outputs;
 (e) Decode keyboard 15 outputs;
 (f) Store loco to control assignments;
 (g) Store inertia enable 'switches';
 (h) Effect inertia action by incrementing or decrementing speed;
 (i) Encode locomotive command data words on a rotation basis (time division multiplexing of loco control signals);
 (k) Encode ancillary control words;
 (l) Generate bits used for data word noise protection;
 (m) Perform parallel to serial conversion of data words;
 (n) Perform Frequency Modulation of serial data words and accurately generate direct FM output;
 (o) Synchronise accurately to the zero-crossing reference from external input source;
 (p) Signal each keyboard operation with an audio frequency output to a speaker in the control box for operator 'feedback';
 (q) Signal erroneous keyboard commands/operation with distinct alternative audio frequency output for operator feedback; and
 (s) Decimal to Binary conversion for train numbers.

During the execution of these tasks it will be necessary for the device to store certain parameters on a dynamic basis. Storage allocation will have to be given for the following parameters:
 (a) Individual present locomotive speeds;
 (b) Individual locomotive directions;
 (c) Inertia timing for each locomotive;
 (d) Controller allocations (by locomotive no.);
 (e) Transmission register buffer;
 (f) Controller multiplex count;
 (g) Locomotive multiplex count;
 (h) Debounce timing count for control switches;
 (i) Parity calculation;
 (j) Command storage for repeat function;
 (k) Timing counts for transmission; and
 (l) Temporary registers for decoding, etc.

Since the number of speed controls that might be attached to the control box may vary depending on the complexity of system required, it is desirable that the number of connections to each one be minimized. By using a 'bus' arrangement for the speed inputs, any number can be attached as required, eliminating the need for individual wiring.

Multiplexing the connections reduces the quantity of conductors considerably with minimal inconvenience. For example, on the controller arrangement only 13 conductors are necessary to connect 16 controls each with 15 speed positions and each with a momentary action (push button) reversing switch control.

The Forward/Reverse state of each loco is stored in MPU 12 and alternated each time a particular direction is pressed to change direction.

As can be appreciated from FIG. 6, the inputs to the MPU 12 are multiplexed in a way which is in effect an extension of the scheme used in calculator type keyboards. The keyboard 15 includes a conventional matrix of rows and columns of conductrors unique connections between which can be made by pressing specific keys. The column conductors are connected to respective output lines R6–R9 of MPU 12 while the row conductors are connected to respective inputs K1, 2, 4 and 8 which are also connected via a 4 wire bus and multiplex-diodes 21 to each of the multi-position switches 22 of each of controls 11a, b, etc. The multi-position switches 22 of each control 11a, b, etc. are connected by a resistor such as 23 and a diode such as 24 to one each of four output lines R0 to R3 and four multiplexing lines 01 to 04, the specific permutation of connections to the lines 01-04 and R0-R3 identifying each switch 22.

Appropriate control of the states of the outputs 01-04 and R0-R3 and R6-R9 under software control enables the MPU 12 to input data from keyboard 15 and each of the controls 11a, b.

The system illustrated involves the use of two distinctly differently functioning receivers 10, namely (a) To receive and decode locomotive control signals and translate into suitable phase control output e.g. to a triac (etc.); and (b) to receive and decode ancillary control signals and translate into either a steady state or momentary output, to drive a power device (e.g., triac), to actuate a point motor or other solenoid device or switch on lights (e.g. signals).

However, in the interests of economy these two functions are combined in a single design of receiver chip which is a custom built chip, or a suitably programmed MPU, arranged to identify, by means of electrical connections to it, the type of device (e.g. locomotive or points) and respond appropriately to control signals addressed to it and received via the track. The reception of the signal being common to all devices, it is only necessary to select the alternative appropriate decode and output functions for use in a particular device. The coding scheme is optimised in such a way to make these requirements use as many common components as necessary.

In order that costs are minimised, a major portion of the receiver may be integrated on a single IC chip. Since it is not easily possible to mix analogue and digital techniques to chip uses entirely digital techniques even where analogue functions are required.

Figure 7:
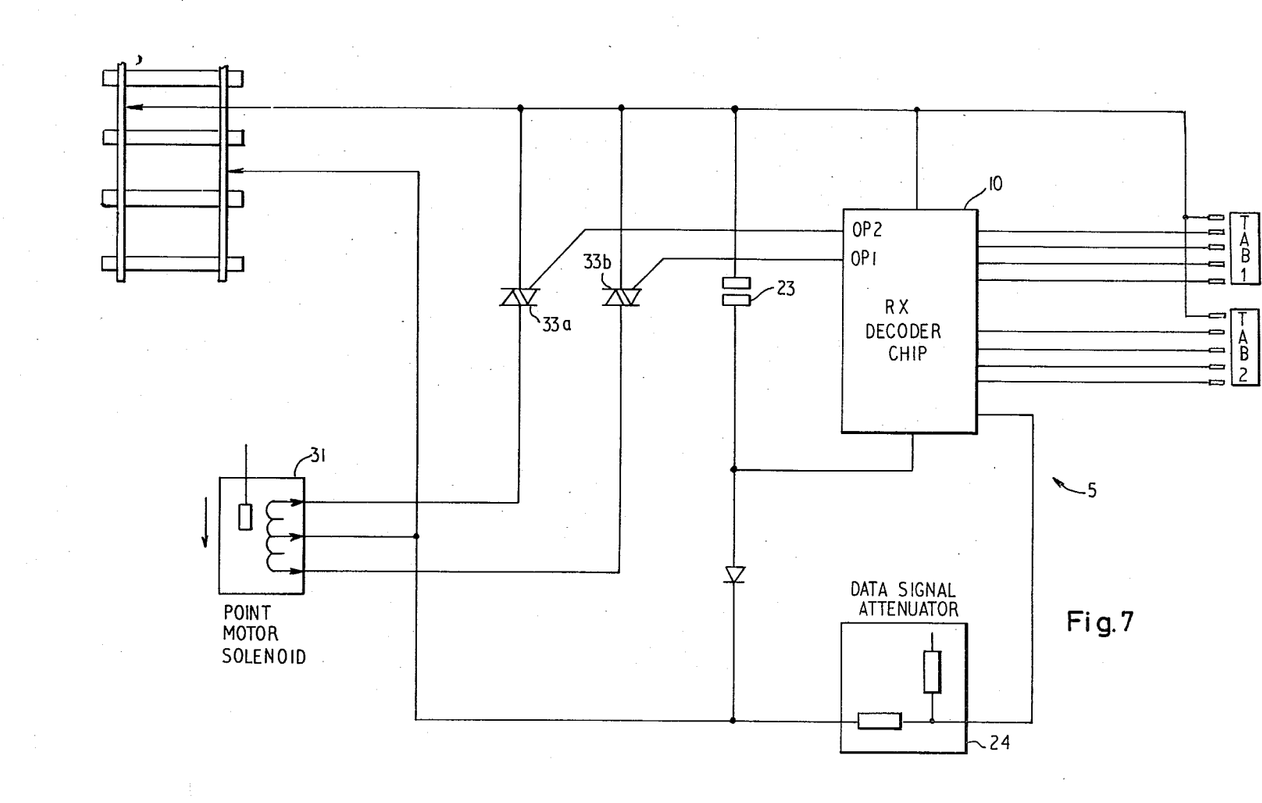
FIGS. 7 and 8 show two types of electrical device and associated receivers.
Figures 8, 10:
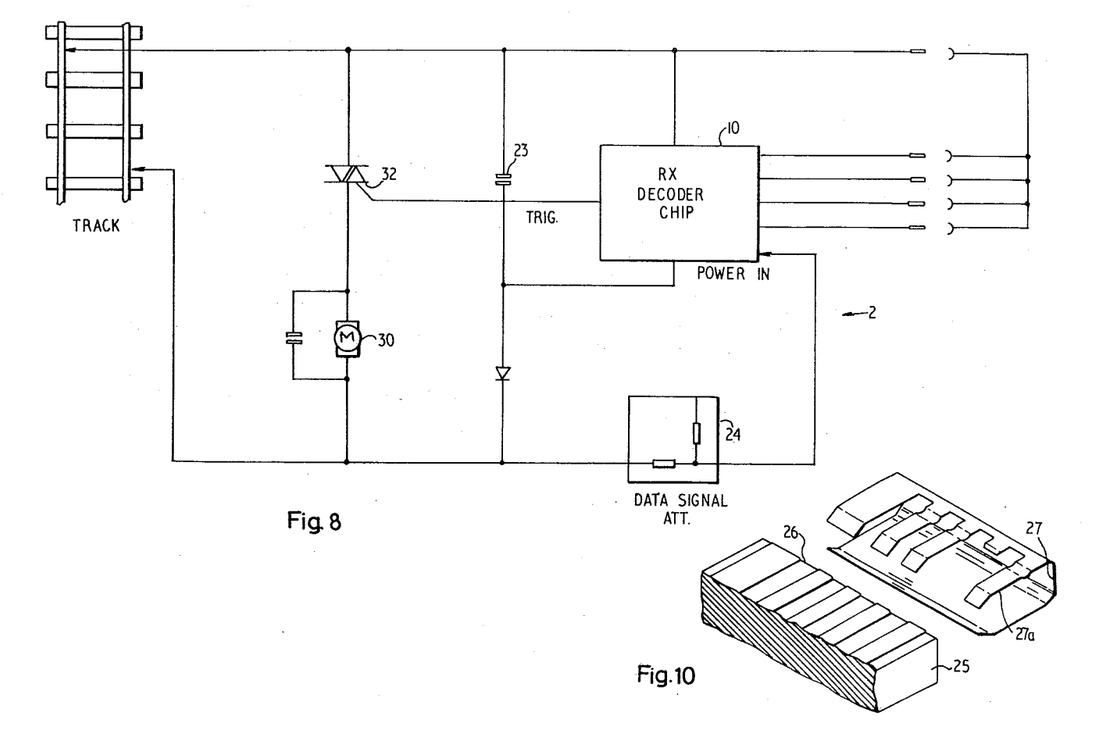
FIG. 10 is a perspective view of an arrangement for selecting the address data to which an associated receiver will respond.

The single chip IC 10 is common to both ancillary and loco receivers (FIGS. 7 and 8, respectively,). Power for the chip is derived by halfwave rectification with a reservoir capacitor 23. Current consumption of the chip is minimised by utilising low power semiconductor technology.

The incoming signal (data) is externally attenuated prior to input to the chip by means of attenuator 24, as the peak voltages can be quite high. Attenuation is also necessary in order for the data to be sliced at the correct level.

So that each receiver can be uniquely identified, each one will have either one or two binary encoded tabs as illustrated in FIG. 10. As indicated in FIG. 10 each tab comprises a insulating plastics substrate 25 on one major surface of which is a series of parallel conductive strips such as 26. One of the strips is connected to the receiver common and the remainder of which are connected to inputs of the receiver chip 10.

A metallic spring clip 27 having a number of removable spring fingers is placed on the end of the substrate and breaking off selected ones of the fingers leaves the remaining fingers tying the associated chip inputs to the common line thereby providing a code which determines the address associated with the chip. Whether the chip functions as a receiver for a locomotive or for an ancillary is determined by the number of tabs provided, one for a locomotive and two for an ancillary. Thus the fingers of the tabs selectively short out binary combinations to set up address code inputs to the chip which in turn are compared with the incoming addresses transmitted from the controller. When a true comparison is made that particular decoder becomes activated. If there is only one address tab 'plugged' in (binary encoded 0 to 15), the chip will decode the signal as a new speed command and alter the phase angle trigger drive to the motor control triac. If there are two address code tabs 'plugged' in, then one of the two output devices will be driven to change the state of the point motor (etc.) connected thereto.

The choice output drive device(s) for the control of the small DC drive motors such as 30 and 31 is largely an economic one. Triacs offer the power handling capacity, robustness, generally small physical size combined with bi-directional capability. The direction of the locomotive drive motor 30 under the control of triac 32 in FIG. 8 may be reversed (reversing current polarity) simply by changing the triggering phase by 180°.

In order to guarantee minimal firing requirements the device is triggered with a negative current input, and by arranging that the chip has an internal current source, there need be no limiting resistor between the chip output and the triac's gate.

At least where the chip is to act as a locomotive receiver, it is programmed to deliver trigger pulses to the associated triac(s) not just once per supply cycle but rather as a train of narrow pulses at high frequency (say 2 KHz) from the point of the required firing angle to within a few milliseconds of the zero-crossing point. This ensures proper latching of the device when with an intermittent load i.e., the commutator motor.

The drive devices for the ancillary are relatively non-critical. Triacs or thyristors (SCR's) could be used. If a DC supply were available, so could ordinary bipolar transistors.

Generally two outputs are required for an ancillary to produce a differential mechanical (e.g., point motors) or electrically alternate (e.g., signal lights) output.

However, two modes of operation for an ancillary receiver are necessary:

(A) For signals etc, either of two outputs continuously energised at full power to provide nearly 180° conduction for one of the triacs 33a, 33b (FIG. 7), with the outputs being alternated by signal command.

(B) For points etc, either output is momentarily energised at full power (nearly 180° conduction for triac 33a or 33b on signal command, with a duration of the output long enough for worst case operation of solenoid mechanics.

On the basis of the overall system requirements and those of basic receiver, the functions to be performed by the receiver chip by hardware and software, where appropriate are:

(a) Slice data input at a predetermined level;
(b) Generate internal high frequency clock within limits;
(c) Separate data and line frequency (50 Hz Europe/60 Hz U.S.);
(d) Use line frequency as a reference for accurate internal clock;
(e) Filter impulse noise from data signal;
(f) Discriminate between data '1's and data '0's;
(g) Regenerate data clock;
(h) Convert demodulated serial data to parallel for decoding;
(i) Perform parity check on data;
(l) Lock out further decoding on detection of erroneous data;
(m) Perform comparison of transmitted and tab inputted address codes;

(n) According to tab input reconfigure to either decoding loco or ancillary commands;

In loco mode only:

(o) Store current speed and direction data indefinitely until valid (address correct and error free) speed and direction update received and decoded).

(p) Translate current speed and direction into phase angle terms reference to AC supply phase;

(q) Generate suitable triggering pulses for firing a triac according to (p)

In ancillary mode only:

(r) Detect whether mode (A) or (B) above is required according to applied special input;

(s) If both address tab inputs compare with transmitted address code, latch direction bit;

(t) Mode A only:

The complimentary direction latch output states are continuously translated to 2 external chip outputs. The active one has gated bursts of trigger pulses for 180° triac conduction firing. (In fact, 180° conduction is not feasible, but 140° equates to 93% of the available power).

(u) Mode B:

If the direction latch changes only state on signal command, the output timer is enabled and the chip outputs turned on according to the state of the complimentary output of the direction latch. The active output has gated bursts of trigger pulses for 180° triac conduction firing for the duration of the timer (1.5 seconds).

Figure 9:
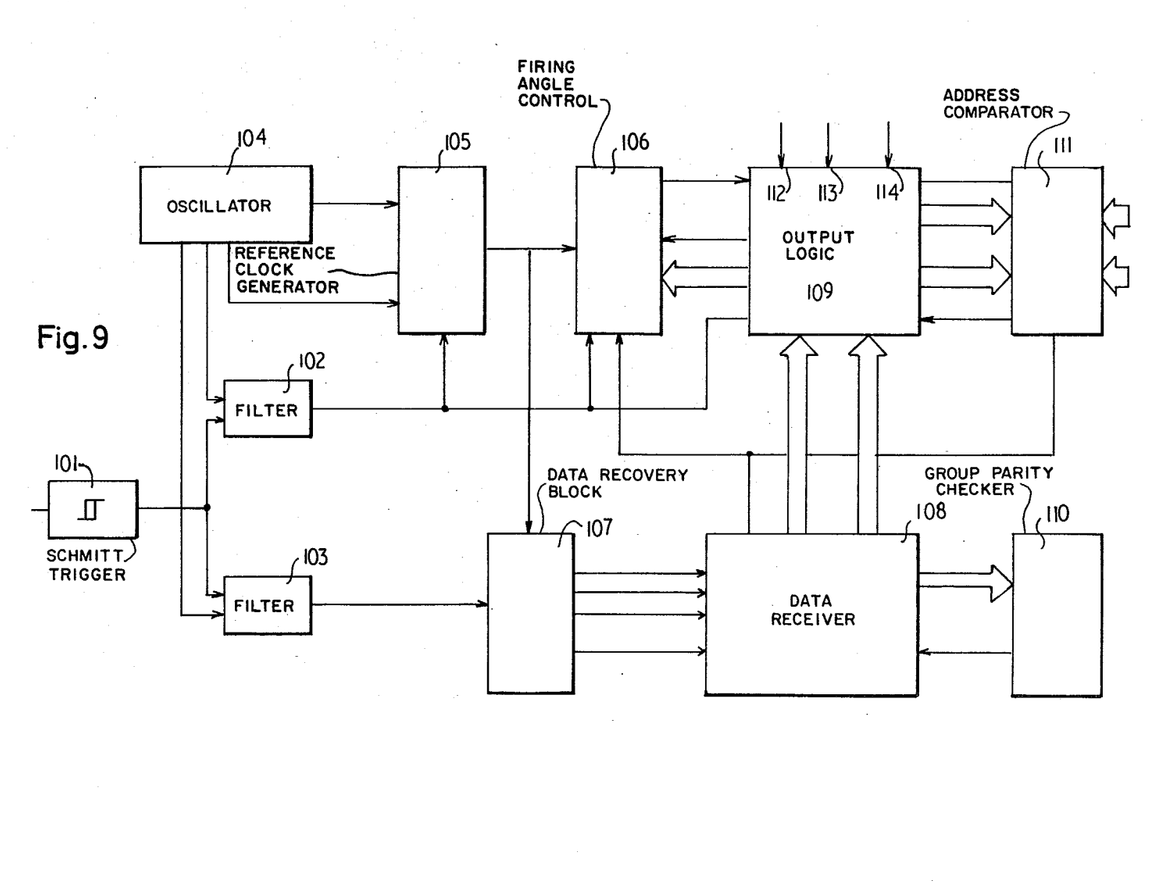
FIG. 9 is a block diagram showing various functional parts of the receiver.

FIG. 9 shows one way in which the receiver functions may be partitioned. The input is sliced by a Schmitt trigger 101 and applied to a line frequency digital filter 102 and to a data digital filter 103. A free-running master oscillator 104 (which may be the MPU clock generator) provides a high frequency (say 400 KHz to 1 MHz) clock train to a reference clock generator 105 and also clocks the filters 102 and 103. The generator 105 which also receives the supply frequency from line filter 102 uses two 4 bit counters produces a train of high frequency pulses synchronised with the supply waveform and in non-overlapping relation with the control signal time slots to a firing angle control 106 and also a data recovery block which receives the output of filter 103, determines whether that output is data or noise and, if it is data, it produces one signal representing whether the data is a "1" or a "0" and two further signals representing the rising and falling edges of the signal. Discrimination between data and noise is done by clocking an internal counter for the duration of the "data" pulse by means of clock generator 105 and monitoring the count achieved by the counter. If the count is outside a range bounded by preset maximum and minimum values, the pulse is rejected as noise while if the count is within the range the pulse is accepted and identified as a "1" or "0" by the actual value of the count. The signals from data recovery block 107 are applied to a data receiver 108 which converts the data to parallel form. Unless a parity error is detected by the group parity checker 110, the now parallel data bits are applied to output logic 109 in which they are stored (until a new update is correctly received). Assuming no parity error is detected, address comparator 111 compares the received address information with the address set up on the receiver tabs and if correspondence is detected, the outputs 112-114 of the output logic 109 are enabled. The outputs 113 and 114 apply streams of trigger pulses to associated triac loads while the output 112 is a latched output which changes state when the receiver receives an appropriate command.

In the ancillary mode the presence of two receiver tabs causes a desirable signal to be applied by the logic 109 to the firing angle control 106 so that the trigger pulses delivered by the control 106 back to the logic 109 to gate the loads on outputs 112-114 represent simple on/off information. In the locomotive mode, the firing angle control compares the speed command data from logic 109 with the contents of an internal counter clocked by generator 105 to determine the instant during the supply cycle when the train of trigger pulses should start.

It will be apparent that the function of the filters 102, 103, generator 105 data recovery block 107, receiver 108, parity checker 110, comparator 111, and firing angle control 106 may be implemented by software.

All controller to train or ancillary (points) control will be done by means of a Digital binary coded word transmitted serially. The number of bits used in the word is a prime consideration of the system. This number Wx, is calculated as follows:

Control up to 16 trains will require an address code to uniquely command each train receiver W0-3, Train Address=4 bits To set the speed of each train over a range of discrete values within the range of simple encoding (by binary encoded switch) and minimum step size for analogue control equivalence will be 16 steps inclusive of stop and full on W4-7, Speed Setting=4 bits Direction will be set by an additional bit to set either forward and reverse W8, Direction=1 bit Periodically, or as required, a command may be issued to an ancillary controller, e.g., a point motor control receiver. This must be identified as such so that it may be distinguished from the train commands. Since bits W0 to W8 will now be available for re-allocation, up to $2^9=512$ individual on/off control functions could be commanded by using the same bits of the word.

W9, Train/Ancillary designator=1 bit

Since the transmission system to be employed is serial, additional bits will have to be added as a percursor to avoid noise confusion, enable identification and synchronisation for the data portion.

PW1, PW2 Minimum Precursor=2 bits

Since the transmission system is liable to considerable noise interference, it is essential that some form of data protection is employed, i.e., parity. If the total word length is made up to a 'convenient' number for control and transmission generation and reception: say a word length Wx=16 hence:

W10-13, Parity Protection=4 bits

TOTAL=16 bits

Minimum if only 1 parity bit used=13 bits

The following is an example of one operating scheme for the keyboard 15 with 1 to 16 locomotives and 1 to 80 ancillaries.

(a) Train Addressing

To address locomotive number 3 key [LOCO] followed by [3] followed by [ENTER]. The power control 11a on Controller 4 now operates locomotive 3. Locomotive direction would be determined by the position of the FORWARD/REVERSE switch 18.

(b) Incorrect Entry

If an incorrect locomotive is keyed in before the ENTER key is depressed, keying CLEAR followed by the desired locomotive number will right the error.

(c) Train re-addressing

To address a different locomotive, repeat (a) using the new locomotive code.

(d) Inertia Control

The system has a fixed level of inertia control. To switch out inertia, key INERTIA CLEAR. The same level of inertia control is applied to all locomotives.

(e) Points Control

To operate point number 33 to direct a locomotive to a branch line, key 3 3 followed by

ENTER BRA

To operate point number 19 to direct a locomotive onto the main line, key 1 9 followed by

ENTER MAIN

(f) Assigning Slave Controllers to Trains

To assign controller 4 to train 12 depress CONTROL 4 LOCO 1 2 ENTER.

With respect to operation (a), it may be noted that even with a layout with only one control 11, during addressing and speed setting of one locomotive, any other locomotives will continue to run at their previously set speeds as these are held until individually updated.

A suitable microprocessor for use as the MPU12 is the TMS1000 supplied by Texas Instruments Ltd., This IC may also be used as the receiver chip although it may in those circumstances be appropriate to use a lower data transmission rate for reliable receiver functioning.

We claim:

1. A remote control system for controlling one or more electrical devices via power supply lines used to energise the device or devices, in use there being applied across the same supply lines a composite waveform comprising control signals and a cyclically repeating power supply waveform, the control signals comprising address information signals designating the device to which the control signal is addressed and control information signals individually designating the action required of the addressed device, each cycle of the power supply waveform comprising one or more intervals during which it is substantially zero in amplitude, the system comprising a transmitter for producing the control signals in timed relationship with the power supply waveform so that each control signal is transmitted in its entirety during a respective one of said intervals after the power supply waveform has achieved a zero amplitude, and at least one receiver adapted to receive said composite waveform and to identify received control signals assigned thereto and to appropriately control an associated electrical device, said at least one receiver including storage means for storing the control signal assigned thereto until updated during the next respective interval.

2. A remote control system according to claim 1 wherein the at least one receiver is arranged to maintain the associated electrical device in an inoperative condition for the duration of each said interval.

3. A system according to claim 1 wherein the power supply waveform is rectangular.

4. A system according to claim 1 wherein the arrangement is such that each control signal comprises a binary word, the bits of which are transmitted sequentially and binary "ones" and "zeros" are represented by integral numbers of cycles of square waves of respective, different frequencies.

5. A remote control system according to claim 1 wherein there is a plurality of receivers and the transmitter comprises a plurality of user operable controls for controlling respective electrical devices associated with the receivers, the transmitter being operative to produce control signals in accordance with the settings of said controls.

6. A system according to claim 5 wherein the transmitter is arranged to define a number of time slots during which it produces control signals assigned to respective ones of the receivers.

7. A system according to claim 6 wherein the arrangement is such that each time slot occurs in a respective one of said intervals.

8. A system according to claim 6 wherein ech of a number of the receivers is assigned a respective time slot and control signals for further ones of the receivers are transmitted by using one of those time slots.

9. A transmitter for a remote control system in use of which one or more electrical devices are controlled using control signals transmitted via the power supply lines used to energize the device or devices, the waveform across the same power supply lines comprising control signals and a cyclically repeating power supply waveform, the control signals comprising address information signals designating the device to which the control signal is addressed and control information signals individually designating the action required of the addressed device, the power supply waveform comprising at least one interval during each cycle during which its amplitude is substantially zero, the transmitter comprising circuitry arranged to produce the control signals in timed relation with the power supply waveform so that each control signal is transmitted in its entirety during a respective one of said intervals after the power supply waveform has achieved a zero amplitude, each control signal from the transmitter being assigned to a receiver of the type including storage means for storing the respective control signal assigned thereto until updated during the next respective interval.

10. A transmitter according to claim 9 and adapted for simultaneous use with a plurality of receivers.

11. A transmitter according to claim 10 and arranged to define a number of time slots during which control signals for respective receivers are transmitted.

12. A transmitter according to claim 10 and including at least one user operable control for setting the control information.

13. A transmitter according to claim 12 wherein a plurality of such controls are each assignable to a respective receiver.

14. A transmitter according to claim 13 and including a further user operable control for assigning said controls to particular ones of the receivers.

15. A transmitter according to claim 14 wherein said further user operable control comprises a keyboard.

16. A transmitter according to claim 12 wherein the at least one user operable control comprises a multiple position switch.

17. A transmitter according to claim 12 wherein the circuitry comprises a microprocessor having inputs and outputs between which the user operable controls comprise switches, the microprocessor being arranged to strobe its outputs to identify which of said switches are closed.

18. A transmitter according to claim 9 and including a switching amplifier for producing at least said control signals for application to said lines.

19. A transmitter according to claim 18, the transmitter circuitry being arranged to supply a signal to the switching amplifier causing it to synthesize the power supply waveform.

20. A transmitter according to claim 19 and arranged to synthesise a rectangular power supply waveform.

21. A transmitter according to claim 19 wherein the switching amplifier arrangement comprises two switching amplifiers arranged to supply voltages of opposite polarities with respect to one another across the power supply lines.

22. A transmitter according to claim 9 wherein the circuitry comprises a microprocessor.

23. A transmitter according to claim 18 wherein the circuitry comprises a microprocessor having an output connected to control the switching amplifier arrangement.

24. A receiver for a remote control system in which control signals are transmitted to at least one such receiver via power supply lines used to energise an electrical device or devices associated with at least one such receiver, the same power supply lines, in use, carrying a composite waveform comprising a cyclically repeating power supply waveform having one or more intervals during each cycle when its amplitude is substantially zero and control signals, the control signals comprising address information signals designating the device to which the control signal is addressed and control information signals individually designating the action of the addressed device, each control signal being transmitted in its entirety during a respective one of said intervals after the power supply waveform has achieved a zero amplitude, the receiver being adapted to identify control signals assigned thereto and to appropriately control an associated electrical device in response thereto, and said receiver including storage means for storing the respective control signals assigned thereto until updated during the next respective interval.

25. A receiver according to claim 24 and arranged to turn the associated electrical device off for the duration of each said interval in the latter part of which a control signal occurs.

26. A receiver according to claim 24 and comprising signal processing circuitry for identifying and decoding control signals addressed to the receiver and an output element for controlling the power supply to the associated electrical device in accordance with the decoded control signals.

27. A receiver according to claim 26 wherein the output element requires to be triggered during each half-cycle during which it is to conduct and the signal processing circuitry is arranged to trigger the element appropriately in accordance with decoded control signals.

28. A receiver according to claim 26 wherein the signal processing circuitry is arranged so as not to trigger the element during each of the intervals during the latter part of which a control signal occurs.

29. A receiver according to claim 26 wherein the signal processing circuitry comprises means to identify an address portion of the control signals and to determine whether the address portion designates that receiver.

30. A receiver according to claim 29 wherein the address of the receiver is user selectable by the user establishing selective permanent connections within the receiver circuitry.

31. A receiver according to claim 30 and comprising a plurality of breakable tabs providing said selective connections.

32. A receiver according to claim 31 wherein the tabs are on a spring clip arranged to fit on the edge of a circuit board on which the receiver circuitry is mounted.

33. A remote control system for controlling one or more electrical devices via power supply lines used to energise the device or devices, in use there being applied across the same supply lines a composite waveform comprising control signals and a pulsed cyclically repeating power supply waveform, the control signals comprising address information signals designating the device to which the control signal is addressed and control information signals individually designating the action required of the addressed device, each cycle of the power supply waveform comprising one or more intervals during which it is substantially zero in amplitude, the system comprising a transmitter for producing the control signals in timed relationship with the power supply waveform so that each control signal is transmitted in its entirety during a respective one of said intervals after the power supply waveform has achieved a zero amplitude, and at least one receiver adapted to receive said composite waveform and to identify received control signals assigned thereto and to appropriately control an associated electrical device, said at least one receiver including storage means for storing the respective control signal assigned thereto until updated during the next respective interval.

34. A transmitter for a remote control system in use of which one or more electrical devices are controlled using control signals transmitted via the power supply lines used to energize the device of devices, the waveform across the same power supply lines comprising control signals and a pulsed cyclically repeating power supply waveform, the control signals comprising address information signals designating the device to which the control signal is addressed and control information signals individually designating the action required of the addressed device, the power supply waveform comprising at least one interval during each cycle during which its amplitude is substantially zero, the transmitter comprising circuitry arranged to produce the control signals in timed relation with the power supply waveform so that each control signal is transmitted in its entirety during a respective one of said intervals after the power supply waveform has achieved a zero amplitude, each control signal from the transmitter being assigned to a receiver of the type including storage means for storing the respective control signal assigned thereto until updated during the next respective interval.

35. A receiver for a remote control system in which control signals are transmitted to at least one such receiver via power supply lines used to energise an electrical device or devices associated with the at least one receiver, the same power supply lines, in use, carrying a composite waveform comprising a pulsed cyclically repeating power supply waveform having one or more intervals during each cycle when its amplitude is substantially zero and control signals, the control signals comprising address information signals designating the device to which the control signal is addressed and control information signals individually designating the action of the addressed device, each control signal being transmitted in its entirety during a respective one of said intervals after the power supply waveform has achieved a zero amplitude, the receiver being adapted to identify control signals assigned thereto and to appropriately control an associated electrical device in response thereto, and said receiver including storage means for storing the respective control signals assigned thereto until updated during the next respective interval.

36. A system according to one of claims 1, 9 or 24 wherein each control signal is transmitted in its entirety during the latter part of a respective one of said intervals.

* * * * *